United States Statutory Invention Registration [19]

[11] Reg. Number: H456

Hara et al. [43] Published: Apr. 5, 1988

[54] THERMODEVELOPABLE SILVER HALIDE PHOTOGRAPHIC MATERIAL AND PROCESS FOR PRODUCING IMAGES THEREWITH

[75] Inventors: Hiroshi Hara; Noboru Ohta; Tsuneo Suzuki, all of Kanagawa, Japan

[73] Assignee: Fuji Photo Film Co., Ltd., Minami-ashigara, Japan

[21] Appl. No.: 697,551

[22] Filed: Feb. 1, 1985

[30] Foreign Application Priority Data

Feb. 1, 1984 [JP] Japan ..... 59-16279

[51] Int. Cl.[4] ..... G03C 5/54; G03C 1/40; G03C 7/00

[52] U.S. Cl. ..... 430/203; 430/559; 430/561; 430/562; 430/617; 430/619; 430/351; 430/505

[58] Field of Search ..... 430/203, 559, 561, 562, 430/617, 351, 619, 505

[56] References Cited

U.S. PATENT DOCUMENTS

| | | | |
|---|---|---|---|
| 3,531,286 | 9/1970 | Renfrew | 430/559 |
| 3,647,437 | 3/1972 | Land | 430/221 |
| 4,235,957 | 11/1980 | Kohrt et al. | 430/203 |
| 4,439,513 | 3/1984 | Sato et al. | 430/203 |
| 4,463,079 | 7/1984 | Naito et al. | 430/203 |
| 4,474,867 | 10/1984 | Naito et al. | 430/203 |

OTHER PUBLICATIONS

*Research Disclosure* 17326, pp. 49–51, Sep. 1978.

*Primary Examiner*—John F. Terapane
*Assistant Examiner*—Susan Wolffe
*Attorney, Agent, or Firm*—Sughrue, Mion, Zinn, Macpeak & Seas

[57] ABSTRACT

A thermodevelopable photographic material is described, comprising a support, at least one photographic silver halide emulsion layer coated thereon, and a dye donating substance capable of forming or releasing a mobile dye in response to, or in inverse response to, the reduction of silver halide in said emulsion to silver by heating, wherein the color of an image formed by the fixing of each of said mobile dyes released by exposure and heating to a dye fixing layer is within the range of $a^*=10$ to $-18$ and $b^*=10$ to $-18$ determined from tristimulus values in the 10 degree visual field XYZ system under standard light C.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMODEVELOPABLE SILVER HALIDE PHOTOGRAPHIC MATERIAL AND PROCESS FOR PRODUCING IMAGES THEREWITH

FIELD OF THE INVENTION

This invention relates to a thermodevelopable photographic material adapted for use in a process which comprises forming a dye image by heating the material in a substantially water-free condition and transferring it to a dye fixing layer to form an image which is substantially black at high density, gray at low density, and can replace silver images.

BACKGROUND OF THE INVENTION

Photographic processes involving the use of silver halides have been widely used heretofore because of their superior photographic properties, such as sensitivity, tone adjustment etc., in contrast to other photographic processes such as electrophotography or diazo photography.

In recent years, techniques have been developed for obtaining images easily and rapidly using silver halide photographic materials by processing them in the dry state, such as by heating, instead of conventional wet treatments such as using developer solutions.

Thermodevelopable materials are known in the art, and thermodevelopable materials and processes therefore are described, for example, in *Fundamentals of Photographic Engineering* (a Japanese-language publication published by Corona Co. in 1979), pages 553–555; *Image Information* (published April 1978), page 40; *Nebletts Handbook of Photography and Reprography,* 7th Ed., 1977 published by Van Nostrand Reinhold Company, pages 32–33, U.S. Pat. Nos. 3,152,904, 3,301,678, 3,392,020 and 3,457,075, British Pat. Nos. 1,131,108 and 1,167,777, and *Research Disclosure,* June 1978, pages 9–15 (RD No. 17029).

Nowadays, in the field of image information, black-and-white images have been largely replaced by color images because of the large quantities of information and the ease of expression, but in many fields, for example in medical therapy, black-and-white images are still preferred.

Commercially available photographic materials based on a system in which the unused silver halide is left within the photographic materials after processing are known. Thus, upon exposure to strong light or long-term storage, the remaining silver halides or silver behenate gradually reacts to cause coloration of the white background. Furthermore, according to this system, the silver cannot be recovered, unlike processes using color coupling, and this gives rise to a problem in regard to resources.

*Research Disclosure,* September 1978, pages 49–51 (RD No. 17326) discloses a process in which a black color image is obtained by dry processing. This process is also of the unfixed type with the inclusion of silver or silver halide in the color image, and has the same defect as stated above. No method has so far been known which can give a black-and-white image free from silver or a silver salt by dry processing.

SUMMARY OF THE INVENTION

One object of this invention is to provide a new photographic material which is able to provide a substantially black or gray dye image by transferring a mobile dye released by heating in a substantially water-free condition to a dye fixing layer.

Another object of this invention is to provide a photographic material which is able to provide images wherein silver is not substantially contained and the unused silver halide or organic silver salt oxidizing agents are fixed.

Still another object of this invention is to provide a process for forming black or gray images having excellent storage stability by a dry processing treatment.

A further object of this invention is to provide a process for obtaining pleasing black to gray images, hue or tone of which is not changed depending on a light level of an object by a simple procedure.

The present invention achieves these objects and provides a solution to the aforesaid problems of known photographic materials by forming a substantially black or gray dye image in the process of forming colored images by heating in a substantially water-free condition.

More particularly, the above-described objects of the invention are achieved by a thermodevelopable photographic material comprising a support and a photographic silver halide emulsion layer coated thereon, and a dye donating substance capable of forming or releasing a mobile dye in response to, or in inverse response to, the reduction of the silver halide in said emulsion to silver by heating, wherein the color of an image formed by the fixing of said mobil dye released by exposure and heating to a dye fixing layer is within the range of $a^*=10$ to $-18$ and $b^*=10$ to $-18$ determined from tristimulus values in the 10 degree visual field XYZ system under standard light C.

DETAILED DESCRIPTION OF THE INVENTION

The L*a*b* color indicating system is described in Commission International de l'Éclarrage Colorimetry, 2nd Ed. Official Recommendations of the International Commission on Illumination, CIE Publication No. 15.2 (TC-1.3) 1982.

The above values a* and b* can be measured by using a color analyzer, for example, Color Analyzer Type 670, made by Hitachi Limited.

The invention does not depend on L* (light level). In other words, the effect of this invention does not depend on L*.

The mobile dye which forms an image may be one dye or a mixture of two or more dyes.

According to the method of forming dye images in accordance with this invention, heating after imagewise exposure provides a silver image and a mobile dye corresponding to the silver image. By transferring this mobile dye to a dye fixing material, a dye image can be obtained which does not contain silver, silver halides or other undesired compounds.

Formation or releasing of a mobile dye in response to, or inverse response to, the reduction of a silver halide to silver by heating, as referred to in the present invention, denotes the following four reactions which occur following the formation of a development nucleus in silver halide by exposure and the oxidation-reduction reaction of the silver halide with a reducing agent or a reducing dye donating substance in the case of a negative silver halide emulsion, for example.

(1) The reducing agent is oxidized, and the oxidized product reacts with the compound capable of forming or releasing the mobile dye to form or release the mobile dye.

(2) The reducing agent is oxidized, and the remaining reducing agent and the dye donating substance capable of releasing a mobile dye by heating undergo oxidation-reduction reaction to form a reduction product of the dye donating substance which does not release a mobile dye. The unreduced dye donating substance releases a mobile dye by heating.

(3) The reducing dye donating substance is oxidized to a mobile dye.

(4) The reducing dye donating substance capable of releasing a mobile dye by heating is oxidized to form an oxidation product which does not release a mobile dye, and the unoxidized dye donating material releases a mobile dye by heating.

When a positive silver halide emulsion is used instead of the negative silver halide emulsion, the above reactions take place in the non-exposed areas. In the case of reactions (1) and (3), a dye image positive with respect to the silver image is obtained, and in the case of (2) and (4), a dye image negative with respect to the silver image is obtained.

The dye donating substance useful in this invention is represented by the following formula $$D—Y \qquad (I)$$

wherein D represents a dye moiety or its precursor moiety, and Y represents a substrate having functionality such that the diffusibility of the dye donating substance represented by formula (I) changes by the oxidation-reduction reaction induced in the process of thermal development.

That the "diffusibility changes" means that (1) the compound represented by formula (I) which is inherently non-diffusible is rendered diffusible or releases a diffusible dye, or (2) the compound represented by formula (I) which is inherently diffusible is rendered non-diffusible. This change occurs when Y is oxidized or when it is reduced depending upon the nature of Y. The two cases may be properly selected.

Examples of a substance of formula (I) whose diffusibility changes by oxidation of Y include so-called dye releasing redox substrates, such as p-sulfonamidonaphthols (including p-sulfonamidophenols; specific examples are described in Japanese Patent Application (OPI) No. 33,826/73 (corresponding to U.S. Pat. Nos. 3,928,312) and 50,736/78, and European Patent Application (OPI) No. 76,492), o-sulfonamidophenols (including o-sulfonamidonaphthols; specific examples are described in Japanese Patent Application (OPI) Nos. 113,624/76 (corresponding to U.S. Pat. No. 4,055,428), 12,642/81, 16,130/81, 16,131/81 (corresponding to U.S. Pat. Nos. 4,336,322), 4,043/82 and 650/82, U.S. Pat. No. 4,053,312 and European Patent Application (OPI) No. 76,492), hydroxysulfonamide heterocyclic compounds (specific examples are described in Japanese Patent Application (OPI) No. 104,343/76 and European Patent Application (OPI) No. 76,492), 3-sulfonamidoindoles (Japanese Patent Application (OPI) Nos. 104,343/76, 46,730/78, 130,122/79 (corresponding to U.S. Pat. Nos. 4,179,291 and 4,273,855) and 85,055/82, and European Patent Application (OPI) No. 76,492), and α-sulfonamidoketones (Japanese Patent Application (OPI) Nos. 3,819/78 (corresponding to U.S. Pat. No. 4,149,892) and 48,534/79 and European Patent Application (OPI) No. 76,492). The term "OPI" as used herein refers to a published unexamined patent application.

Another example includes the intramolecular assist-type substrates described in Japanese Patent Application (OPI) No. 20,735/82 (corresponding to U.S. Pat. No. 4,358,532) and Japanese Patent Application (OPI) No. 65,839/84 which release dyes to intramolecular nucleophilic attach after the oxidation of Y.

Still another example includes substrates which release dyes by an intromolecular cyclizing reaction under basic conditions but substantially fail to release dyes upon oxidation of Y (specific examples are given in Japanese Patent Application (OPI) No. 63,618/76 (corresponding to U.S. Pat. No. 3,980,479). As a variation of this example, substrates which release dyes by a reaction of the isooxazolone ring under the action of nucleophilic reagents (specific examples of which are described in Japanese Patent Application (OPI) Nos. 111,628/74 and 4,819/77 (corresponding to U.S. Pat. Nos. 4,199,354 and 4,199,355, respectively) are also useful.

A further example includes substrates which under basic conditions liberate the dye moiety by dissociation of acid protons, but substantially fail to release dyes upon oxidation of Y (specific examples are given in Japanese Patent Application (OPI) Nos. 69,033/78 and 130,929/79 (corresponding to U.S. Pat. No. 4,232,107).

Examples of substances whose diffusibility changes upon the reduction of Y include the nitro compounds described in Japanese Patent Application (OPI) No. 110,827/78 (corresponding to U.S. Pat. No. 4,139,379) and the quinone compounds described in Japanese Patent Application (OPI) No. 110,827/78 and U.S. Pat. Nos. 4,356,249 and 4,358,525. These compounds are reduced with the reducing agent (referred to as the electron donor) remaining unconsumed in the thermodevelopment process, and by the intramolecular attack of the resulting nucleophilic group, they release dyes. A useful variety of this example involves quinone-type substrates which permit liberation of a dye moeity by the dissociation of the acid protons of the reduction product (specific examples of such substrate are described in Japanese Patent Application (OPI) Nos. 130,927/79 and 164,343/81 (corresponding to U.S. Pat. No. 4,371,604).

When substrates whose diffusibility changes by reduction are used, it is essential to use a suitable reducing agent (electron donor) which mediates between the silver salt oxiding agent and the dye donating substance. Specific examples of such a reducing agent are described in the above-cited known documents. Substrates (to be referred to as LDA compounds) corresponding to the substrate Y in which electron donors are present together are also useful.

In the present invention, any dye donating substance can be used so long as the color of the image formed on a dye fixing layer satisfies the above-described definition. However, it is convenient to use yellow, magenta, and cyan dye donating substances which are conventionally used in the thermodevelopable color photographic materials.

The present invention can be especially preferably practiced by including at least one yellow dye donating substance, at least one magenta dye donating substance and at least one cyan dye donating substance selected from the above-exemplified image-forming dyes into a layer containing a silver halide and optionally an organic silver salt oxidizing agent or a layer adjacent to this layer.

The amount of each of the dye donating substances is desirably from 0.01 to 4 moles per mole of silver (in silver halide and an organic silver salt) in each silver halide emulsion layer. The ratio of the amounts of the dye donating substances may be selected so that when the dyes are fixed to the dye fixing layer, values of a* and b* of the color of the image come within the aforesaid range.

Examples of preferred dye donating substances are shown below.

Yellow dye donating substances

Y-1

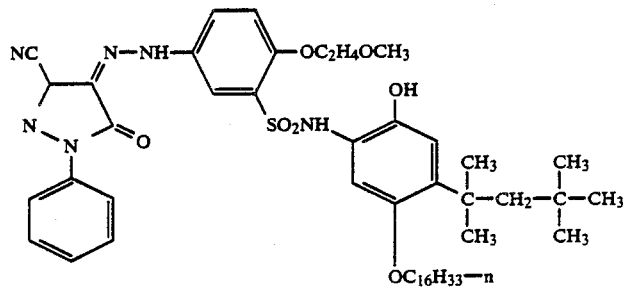

Y-2

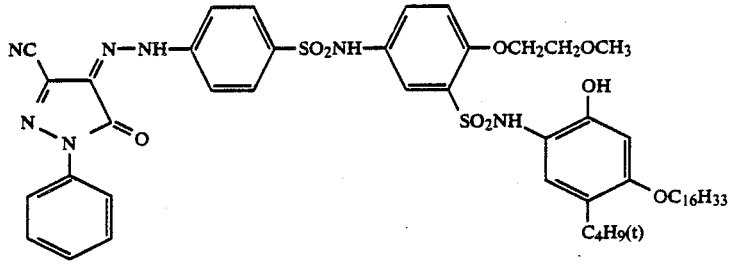

Y-3

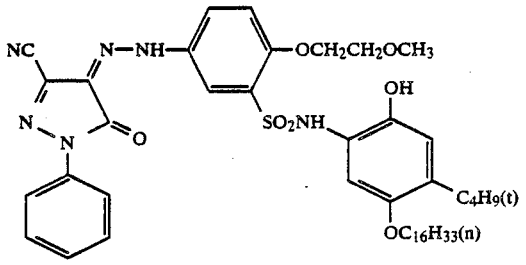

Y-4

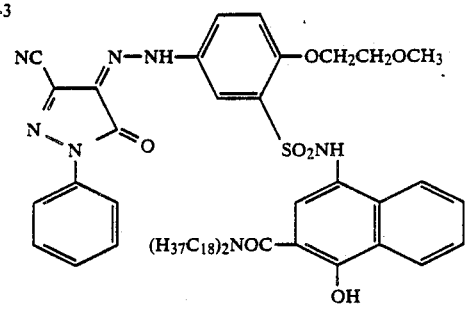

Magenta dye donating substances

M-1

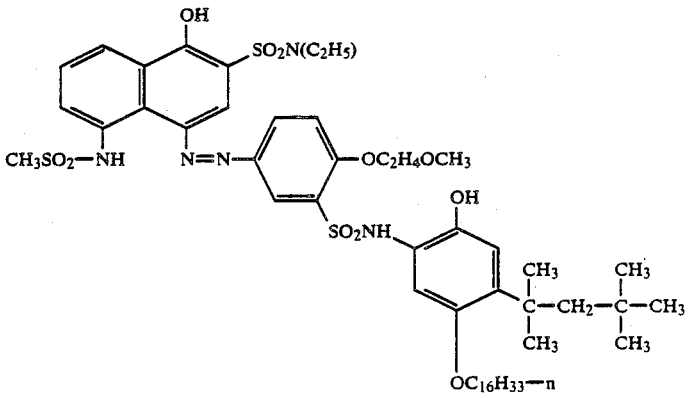

-continued
M-2
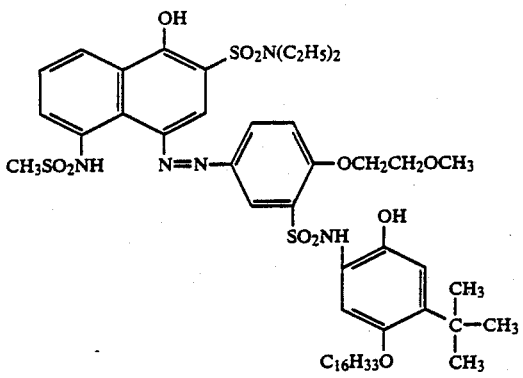
M-3
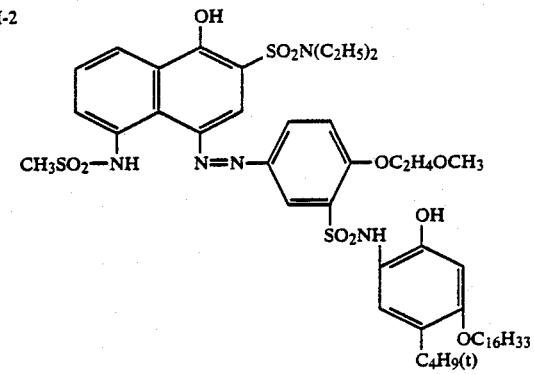
M-4
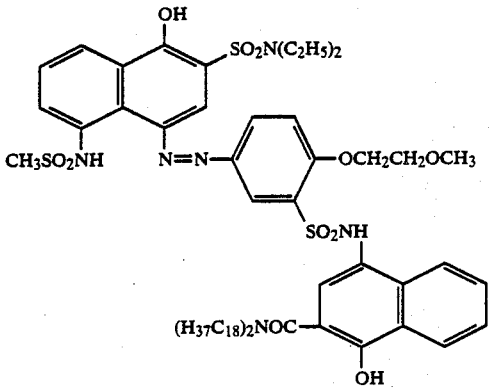
Cyan dye donating substances
C-1
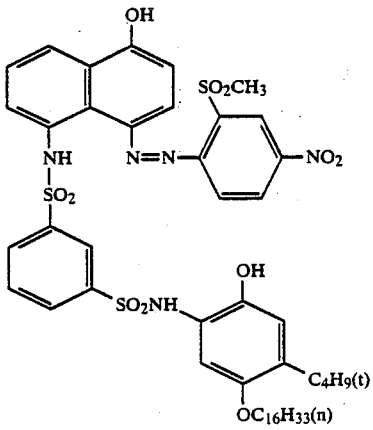

-continued

C-2

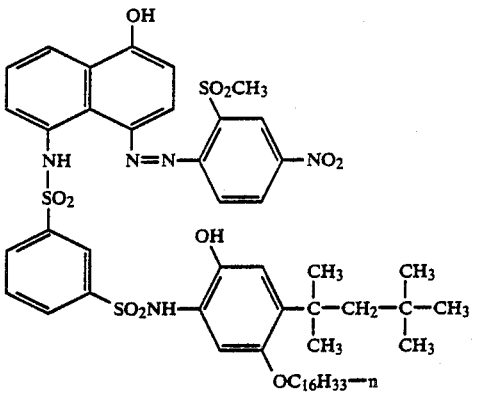

C-3

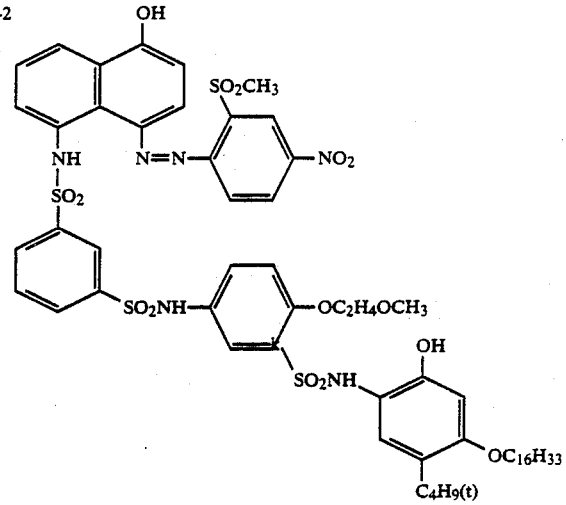

C-4

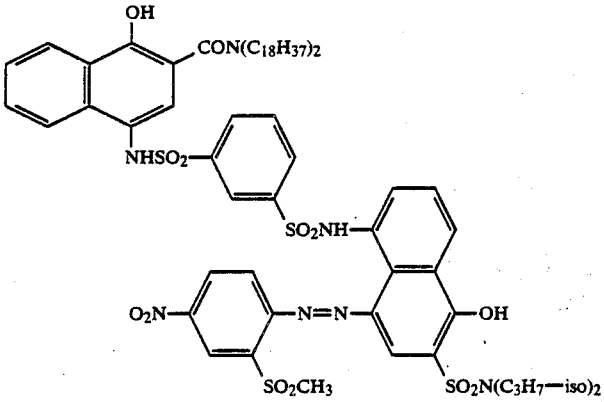

In the photographic material of the present invention, the dye donating substances may be incorporated (1) in the silver halide photographic layer, (2) in a layer adjacent to the silver halide photographic layer (hereinafter referred to as an adjacent layer), (3) or they may be divided into two portions and incorporated in both of these layers. Furthermore, (4) the photographic material of the present invention may have two or more of silver halide layers having the same color sensitivity and each dye donating substances or each portion of divided dye donating substances (may be a mixture) may be incorporated to each silver halide photographic layer or (5) at least one of the silver halide emulsion layers has an adjacent layer containing at least one dye donating substance.

A silver halide photographic material such that all dye donating substances is incorporated in one silver halide emulsion layer can be produced most easily. When a silver halide emulsion layer has an adjacent layer, it is preferable that the silver halide emulsion layer is coated on the adjacent layer. It is preferable that the layer containing a dye donating substance which absorbs light having a wavelength within the range to which the silver halide is sensitive is provided on a support firstly as the lowest layer. It is preferable to provide an interlayer between silver halide emulsion layers or between two combinations of silver halide emulsion layer and an adjacent layer. The interlayer comprises a binder which can be used in the silver halide photographic layer.

An organic silver salt may also be incorporated in the silver halide emulsion layer, if desired.

The adjacent layer further comprises a binder such as that used in the silver halide emulsion layer.

The dye donating substances differ in dye releasing reactions depending upon their structures, and this difference is especially large in the dry image-forming process. It was previously thought that if a black or gray color image is formed by mixing these substances, a difference in hue would arise between high density portions and low density portions, thus causing problems in practical applications. It has now been found that if the color hue is within the range specified in the present invention by human observations, the image does not look particularly colored, but assumes a pleasing achromatic color. The present invention is based on this discovery.

When the dye donating substances represented by formula (I) are used in this invention, the color of a dye to be released can be anticipated. Accordingly, one can determine the ratio of amounts of the dye donating substances which will give the aforesaid range in the chromaticity diagram.

In the present invention, the dye donating substances can be introduced into a layer of the photographic material by known method such as the method described in U.S. Pat. No. 2,322,027. At this time, high-boiling and low-boiling organic solvents can be used.

Examples of the high boiling solvents include alkyl phthalates such dibutyl phthalate and dioctyl phthalate, phosphates such as diphenyl phosphate, triphenyl phosphate, tricresyl phosphate and dioctyl butyl phosphate, citrates such as tributyl acetylcitrate, benzoates such as octyl benzoate, alkylamides such as diethyllaurylamide, fatty acid esters such as dibutoxyethyl succinate and dioctyl azelate, and trimesates such as tributyl trimesate. Examples of low boiling organic solvents having a boiling point of from about 30° to 160° C. include lower alkyl acetates such as ethyl acetate and butyl acetate, ethyl propionate, sec-butyl alcohol, methyl isobutyl ketone, β-ethoxyethyl acetate, methyl cellosolve acetate and cyclohexanone. A mixture of high-boiling organic solvent and lower-boiling organic solvent may be used. The above dye donating substances are dissolved in such solvents and dispersed in a hydrophilic colloid.

The method of dispersing by using polymers such as those described in Japanese Patent Publication No. 3,9853/76 and Japanese Patent Application (OPI) No. 59,943/76 may also be used. Various surface-active agents can be used when dispersing the dye donating substances in a hydrophilic colloid. Examples of surface-active agents used for this purpose include those compounds cited as surface-active agents elsewhere in the specification.

The amount of the high-boiling organic solvent used in this invention is not more than 10 g, preferably not more than 5 g, per gram of the dye donating substance.

Examples of the reducing agent used in this invention include hydroquinone compounds (such as hydroquinone, 2,5-dichlorohydroquinone and 2-chlorohydroquinone, aminophenol compounds (such as 4-aminophenol, N-methylaminophenol, 3-methyl-4-aminophenol and 3,5-dibromoaminophenol), catechol compounds (such as catechol, 4-cyclohexylcatechol, 3-methoxycatechol and 4-(N-octadecylamino) catechol), and phenylenediamine compounds (such as N,N-diethyl-p-phenylenediamine, 3-methyl-N,N-diethyl-p-phenylenediamine, 3-methoxy-N-ethyl-N-ethoxy-p-phenylenediamine and N,N,N',N'-tetramethyl-p-phenylenediamine).

Examples of preferred reducing agents for use in this invention include 3-pyrazolidone compounds (such as 1-phenyl-3-pyrazolidone, 1-phenyl-4,4-dimethyl-3-pyrazolidone, 4-hydroxymethyl-4-methyl-1-phenyl-3-pyrazolidone, 1-m-tolyl-3-pyrazolidone, 1-p-tolyl-3-pyrazolidone, 1-phenyl-4-methyl-3-pyrazolidone, 1-phenyl-5-methyl-3-pyrazolidone, 1-phenyl-4,4-bis(hydroxymethyl)-3-pyrazolidone, 1,4-dimethyl-3-pyrazolidone, 4-methyl-3-pyrazolidone, 4,4-dimethyl-3-pyrazolidone, 1-(3-chlorophenyl)-4-methyl-3-pyrazoline, 1-(4-chlorophenyl)-4-methyl-3-pyrazoline, 1-(4-tolyl)-4-methyl-3-pyrazoline, 1-(2-tolyl)-4-methyl-3-pyrazolidone, 1-(4-tolyl)-(3-pyrazolidone, 1-(3-tolyl)-3-pyrazolidone, 1-(3-tolyl)-4,4-dimethyl-3-pyrazolidone, 1-(2-trifluoroethyl)-4,4-dimethyl-3-pyrazolidone, and 5-methyl-3-pyrazolidone).

Combinations of various developing agents such as those disclosed in U.S. Pat. No. 3,039,869 can also be used.

The preferable amount of the reducing agent added in this invention is from 0.01 to 20 moles, especially preferably from 0.1 to 10 moles per mole of silver of silver halide and an organic silver salt.

Even when a reducing dye donating substance is used in this invention, a so-called auxiliary developing agent may be used if desired. The auxiliary developing agent is a substance when oxidized with the silver halide, has the ability to oxidize a reducing substrate in the dye donating substance.

Useful auxiliary developing agents include hydroquinone, alkyl-substituted hydroquinones such as t-butylhydroquinonne and 2,5-dimethylhydroquinone, catechols, pyrogallols, halogen-substituted hydroquiones such as chlorohydroquinone or dichlorohydroquinone, alkoxy-substituted hydroquionones such as methoxyhydroquinone, polyhydroxybenzene derivatives and methylhydroxynaphthalene. Also useful are methyl gallate, ascorbic acid, ascorbic acid derivatives, hydroxylamines such as N,N'-di-(2-ethoxyethyl)hydroxylamine, pyrazolidones such as 1-phenyl-3-pyrazolidone and 4-methyl-4-hydroxymethyl-1-phenyl-3-pyrazolidones, reductones and hydroxytetronic acids.

The auxiliary developing agent can be used in a predetermined concentration. The concentration range is from 0.0005 to 20 moles, and especially 0.001 to 4 moles, per mole of silver of silver halide and an organic silver salt.

The silver halides used in this invention are, for example, silver chloride, silver chlorobromide, silver chloroiodide, silver bromide, silver iodobromide, silver chloroiodobromide, and silver iodide.

Such a silver halide, for example silver iodobromide, can also be obtained by adding a silver nitrate solution to a solution of potassium bromide to form silver bromide grains and thereafter adding potassium iodide.

Two or more silver halides having different sizes and/or silver halide compositions may be used in combination. The average grain size of the silver halide grains used in this invention is preferably from 0.001 μm to 10 μm, and especially preferably from 0.001 μm to 5 μm.

The silver halide used in this invention may be used as is. If desired, it may be chemically sensitized with a chemical sensitizer such as a compound of sulfur, selenium, or tellurium, or a compound of gold, platinum, palladium, rhodium or iridium, or a reducing agent such as a tin halide, or a combination thereof. Details of chemical sensitization are described in T. H. James, *The Theory of the Photographic Process*, 4th Edition, Chapter 5, pages 149–169, Macimillan Publishing Co., Inc., 1977.

The suitable total amount of the photosensitive silver halide coated in this invention is 1 mg/m$^2$ to 10 g/m$^2$ as silver.

An especially preferred embodiment of this invention involves the joint use of an organic silver salt. When heated in the presence of the exposed silver halide to a temperature of at least 80° C., preferably at least 100° C., the organic silver salt reacts with the dye donating image-forming substance or with a reducing agent to be optionally present together with the image-forming substance to form a silver image. The conjoint use of the organic silver salt oxidizing agent can give a photographic material which develops a color in a high density.

Examples of organic silver salt oxidizing agents are described in Japanese Patent Application (OPI) No. 58,543/83, and include those described hereinafter.

First of all, silver salts of organic compounds having a carboxyl group can be cited. Typical examples are silver salts of aliphatic carboxylic acids and silver salts of aromatic carboxylic acids.

Silver salts having a mercapto or thione group and silver salts of the derivatives of such compounds may also be cited.

Silver salts of compounds having an imino group can also be cited. Examples include silver salts of the benzotriazole and its derivatives described in Japanese Patent Publication Nos. 30,270/69 and 18,416/70, such as a silver salt of benzotriazole, silver salts of alkyl-substituted benzotriazoles such as methylbenzotriazole, silver salts of halogen-substituted benzotriazoles such as 5-chlorobenzotriazole, and silver salts of carboimidobenzotriazoles such as butylcarboimidobenzotriazole; and the silver salts of 1,2,4-triazole or 1-H-tetrazole silver salt, carbazole silver salt, saccharin silver salt and silver salts of imidazole or imidazole derivatives described in U.S. Pat. No. 4,220,709.

The silver salts and organic metal salts such as copper sterate described in *Research Disclosure*, No. 170, 17029, are metal salt oxidizing agents which can also be used in this invention.

Methods for preparing these silver halides or organic silver salts and methods of mixing them are described, for example, in *Research Disclosure, No.* 170, 17029, Japanese Patent Application (OPI) Nos. 32,928/75, 42,529/76, 13,224/74 and 17,216/76, and U.S. Pat. No. 3,700,458.

The suitable total coating amount of the photo-sensitive silver halide and the organic silver salt is from 50 $mg/m^2$ to 10 $g/m^2$ as silver.

Binders may be used singly or in combination in this invention. As a binder a hydrophilic binder may be used. Typical hydrophilic binders are transparent or semitransparent hydrophilic binders, and include organic substances, for example, proteins such as gelatin, gelatin derivatives and cellulose derivatives and polysaccharides such as a starch and gum arabic, and synthetic polymers such as water-soluble polyvinyl compounds (e.g., polyvinylpyrrolidone and polyacrylamide). Other synthetic polymers include dispersed polymeric vinyl compounds in the form of a latex which particularly increase the dimensional stability of photographic materials.

In the present invention, compounds can be used which can simultaneously activate the developement and stabilize the images formed. Examples of a preferred group of such compounds include the isothiuroniums typified by 2-hydroxyethyl isothiuronium trichloroacetate described in U.S. Pat. No. 3,301,678, bis-isothiuroniums such as 1,8-(3,6-dioxaoctane)bis(idothiuronium trichloracetate) described in U.S. Pat. No. 3,669,670, the thiol compounds described in West German Patent Application (Laid Open) No. 2,162,714, the thiazolium compounds such as 2-amino-2-thiazolium trichloroacetate and 2-amino-5-bromoethyl-2-thiazolium trichloroacetate described in U.S. Pat. No. 4,012,260, the compounds having $\alpha$-sulfonyl acetate as an acid moiety, such as bis(2-amino-2-thioazolium) methylenebis(sulfonyl acetate) and 2-amino-2-thiazolium phenyl sulfonyl acetate, described in U.S. Pat. No. 4,060,420, and the compounds having 2-carboxycarboxiamide as an acid moiety described in U.S. Pat. No. 4,088,496.

Also preferred are the azole thioethers and blocked azolinethione compounds described in Belgian Pat. No. 768,071, the 4-aryl-1-carbamyl-2-tetrazoline-5-thione compounds described in U.S. Pat. No. 3,898,859, and compounds described in U.S. Pats. Nos. 3,839,041, 3,844,788 and 3,877,940.

In the present invention, various dye releasing aids can be used. The dye releasing aids are compounds showing basicity and capable of activating the development or so-called mucleophilic compounds. Bases or base precursors are used.

The dye releasing aid can be used both in the photographic material and in the dye fixing material. Base precursors are advantageous for use in the photographic material. The base precursors are compounds which release base components when heated. The base components to be released may be inorganic or organic bases.

Examples of preferred bases include inorganic bases such as hydroxides, secondary or tertiary phosphates, borates, carbonates, quinolinates and metaborates of alkali metals or alkaline earth metals, ammonium hydroxides, and other metal hydroxides, and organic bases such as quaternary alkylammonium hydroxides, aliphatic amines (trialkylamines, jydroxylamines and aliphatic polyamines), aromatic amines (N-alkyl-substituted aromatic amines, N-hydroxyalkylsubstituted aromatic amines and bis[p-(dialkylamino)-phenyl] methanes), heterocyclic amines, amidines, cyclic amidines, guanidines and cyclic guanidines. The betaine tetramethyl ammonium iodide and diaminobutane dihydrochloride described in U.S. Pat. No. 2,410,644, and the organic compounds including amino acids such a 6-aminocaproic acid and urea described in U.S. Pat. No. 3,506,444 are also useful. Bases having a pKa value of at least 8 are especially useful.

Compounds which when heated, induce some reaction and release bases are used as the base precursors, and include, for example, salts of organic acids and bases which when heated, decarboxylated and decomposed, and compounds which are decomposed and release an amine by the Lossen rearrangement, the Beckmann rearrangement, etc. Preferred base precursors are precursors of the aforesaid organic bases. For example, there can be cited salts with heatdecompsable organic acids such as trichloroacetic acid, trifluoroacetic acid, propiolic acid, cyanoacetic acid, sulfonylacetic acid and acetoacetic acid, and the salts with 2-carboxycarboxamide described in U.S. Pat. No. 4,088,496.

Preferred specific examples of the base precursor will be shown below.

Examples of compounds considered to release bases by the decarboxylation of the acid moiety include trichloroacetic acid derivatives such as guanidinetrichloroacetic acid, piperidinetrichloroacetic acid, morpholinetrichloroacetic acid, p-toluidinetrichloroacetic acid and 2-picolinetrichloroacetic acid.

The base precursors described in British Pat. No. 998,945, U.S. Pat. No. 3,220,846, and Japanese Patent Application (OPI) No. 22,625/75 can also be used.

Examples of preferred base precursors other than trichloroacetic acids include the 2-carboxycarboxamide derivatives described in U.S. Pat. No. 4,088,946, the $\alpha$-sulfonyl acetate derivatives described in U.S. Pat. No. 4,060,420 and the salts of propiolic acid derivatives with bases described in Japanese Patent Application No. 55,700/83.

In addition to the organic bases, salts of alkali metals and alkaline earth metals are also effective as the base components, and such salts are described in Japanese Patent Application No. 69,597/83.

Other examples of effective base precursors include the hydroxam carbamates described in Japanese Patent Application No. 43,860/83 utilizing the Lossen rearrangement, and the aldoxime carbamates described in Japanese Patent Application No. 31,614/83 which form nitriles.

The amine imides described in *Research Disclosure*, No. 15776, May 1977, and the aldonamides described in Japanese Patent Application (OPI) No. 22,625/75 are decomposed at high temperatures to form bases, and are preferably used in this invention.

The amount of such a base or base precursor can be used in amounts within a broad range. The useful range is not more than 50% by weight, preferably 0.01 to 40% by weight, based on the total weight of the dry coating of the photographic material.

The above bases or base precursors can be used not only for promoting dye releasing, but also for other purpose, for example for adjusting the pH value.

The aforesaid components constituting the thermodevelopable photographic material of this ivnention can be disposed at any suitable positions. For example, as required, one or more of the components may be disposed in one or more layers of the photographic material. In some cases, it is desirable to include the aforesaid reducing agent, image stabilizer and/or other additives in specified proportions into a protective layer. This is sometimes advantageous because the movement of additives between layers of the thermodevelopable material can be reduced.

The thermodevelopable photographic material of this invention is effective for formation of a negative or positive image. The formation of a negative or positive image will depend mainly upon the selection of specified photosensitive silver halides and the type of the dye donating substance. For example, to form a direct positive image, the internal image silver halide emulsions described in U.S. Pat. Nos. 2,592,250, 3,206,313, 3,367,778 and 3,447,927, or mixtures of the internal image silver halides and surface image silver halide emulsion such as those described in U.S. Pat. No. 2,996,382 can be used.

Various exposing means can be used in this invention. A latent image is obtained by imagewise exposure to radiations including visible light. Generally, light sources used are those ordinarily used for color prints, for example, a tungsten lamp, a mercury lamp, a halogen lamp such as an iodine lamp, a xenone lamp, a laser beam, a CRT light sources, a fluorescent tube and a light emitting diode.

In the present invention, development is performed by applying heat to the photographic material. Means of heating may be a simple hot plate, an iron, a hot roller, or a heat-generating body or the like utilizing carbon or titanium white.

The silver halide used in this invention may be spectrally sensitized with methine dyes or other dyes. Examples of dyes than can be used include cyanine dyes, merocyanine dyes, complex cyanine dyes, complex merocyanine dyes, complex cyanine dyes, complex merocyanine dyes, holopolor cyanine dyes, hemicyanine dyes, styryl dyes and hemioxonol dyes. Especially useful dyes are cyanine dyes, merocyanine dyes and complex merocyanine dyes. Any nuclei usually employed in cyanine dyes may be applied as basic heterocyclic nuclei. Examples are a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus and a pyridine nucleus; nuclei resulting from fusion of alicyclic hydrocarbon rings with these nuclei; and nuclei resulting from fusion of these nuclei with aromatic hydrocarbon rings, such as an indolenine nucleus, a benzindolenine nucleus, an indole nucleus, a benzaxazole nucleus, a naphthoxazole necleus a naphthothiazole nucleus, a benzoselenazole nucleus, a benzimidazole nucleus, and a quinoline nucleus.

Five to six-membered heterocyclic nuclei such as pyrazoline-5-one, thiohydantoin, 2-thiooxazolidine-2,4-dione, thiazolidine-2,4-dione, rhodanine and thiobarbitul nuclei may be applied to merocyanine dyes or complex merocyanine dyes as nuclei having a ketomethylene structure.

These sensitizing dyes may be used singly or in combination. Combinations of sensitizing dyes are frequently used for the purpose of supersensitization. Typical examples are described in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862, and 4,026,707, British Pat. Nos. 1,344,281 and 1,507,803, Japanese Patent Publications Nos. 4,936/68 and 12,375/78, Japanese Patent Application (OPI) Nos. 110,618/77 and 109,925/77.

Together with the sensitizing dyes, a dye having no spectral sensitizing activity or a substance which does not substantially absorb visible light and causes supersensitization may be included into an emulsion. For example, aminostyryl compounds substituted by nitrogen-containing heterocyclic group (such as those described in U.S. Pat. Nos. 2,933,390 and 3,635,721), aromatic organic acid/formaldehyde condensate (such as those described in U.S. Pat. No. 3,743,510), cadmium salts and azaindene compounds may be included. The combinations described in U.S. Pat. Nos. 3,615,m613, 3,615,641, 3,617,295 and 3,635,721 are especially useful.

A support which can withstand processing temperatures is used in the photographic material of this invention, and a color fixing material. Supports generally used include not only glass, paper, metals, and the like, but also films such as acetylcellulose, cellulose ester, polyvinyl acetal, polystyrene, polycarbonate and polyethylene terephthalate films. A paper support to which a polymer such as polyethylene is laminated may also be used. The polyesters described in U.S. Pat. Nos. 3,634,089 and 3,725,070 are preferably used.

In the present invention, a color image is formed by heat development comprises transfer of a mobile dye. For this purpose, the thermodevelopable silver halide photographic material of the present invention is composed of a support having thereon a photographic layer(s) (I) containing silver halide, a dye donating substance and a binder, and a dye fixing layer (II) capable of receiving the mobile dye formed in the photographic layer (I).

The above described photographic layer (I) and the dye fixing layer (II) may be formed on the same support, or they may be formed on different supports, respectively. In the former case the dye fixing layer (II) can be stripped off the photographic layer (I). For example, after the thermodevelopable photographic material is exposed imagewise to light, it is developed by heating uniformly and thereafter the dye fixing layer (II) or the photographic layer (I) is peeled apart. When a photographic material having the photographic layer(s) coated on a support and a fixing material having the dye fixing layer (II) coated on a support are separately formed and they are superposed so that the layers are contacted to each other, after the photographic material is exposed imagewise to light and uniformly heated, the mobile dye is transferred on the dye fixing layer (II).

Further, there is a method wherein only the photographic layer (I) is exposed imagewise to light and then heated uniformly after superposing the dye fixing layer (II) on the photographic layer (I).

The dye fixing layer (II) can contain, for example, a dye mordant in order to fix the dye. In the present invention, various mordants can be used, and polymer mordants are particularly preferred. In addition to the mordants, the dye fixing layer may contain the bases, base precursors and thermal solvents. In particular, it is particularly preferred to incorporate the bases or base precursors into the dye fixing layer (II) in the cases wherein the photographic layer (I) and the dye fixing layer are formed on different supports.

Polymer mordants used in the present invention are polymers containing secondary and tertiary amino groups, polymers containing nitrogen-containing heterocyclic moieties, polymers having quaternary cation groups thereof, having a molecular weight of from 5,000 to 200,000, and particularly from 10,000 to 50,000.

For example, there are illustrated vinylpyridine polymers and vinylpyridinium cation polymers as disclosed in U.S. Pat. Nos. 2,548,564, 2,484,430, 3,148,061 and 3,756,814, etc., polymer mordants capable of cross-linking with gelatin as disclosed in U.S. Pat. Nos. 3,625,694, 3,859,096 and 4,128,538, British Pat. No. 1,277,453, etc., aqueous sol type mordants as disclosed in U.S. Pat. Nos. 3,958,995, 2,721,852 and 2,798,063, Japanese Patent Application (OPI) Nos. 115228/79, 145529/79 and 126026/79, etc., water-insoluble mordants as disclosed in U.S. Pat. No. 3,898,088, etc., reactive mordants capable of forming covalent bonds with dyes used as disclosed in U.S. Pat. No. 4,168,976 (Japanese Patent Application (OPI) No. 137333/79), etc., and mordants disclosed in U.S. Pat. Nos. 3,709,690, 3,788,855, 3,642,482, 3,488,706, 3,557,066, 3,271,147 and 3,271,148, Japanese Patent Application (OPI) Nos. 71332/75, 30328/78, 155528/77, 125/78 and 1024/78, etc.

In addition, mordants disclosed in U.S. Pat. Nos. 2,675,316 and 2,882,156 can be used.

Of these mordants, for example, mordants capable of cross-linking with a matrix such as geletin, water-insoluble mordants, and aqueous sol (or latex dispersion) type mordants are preferably used.

Particularly preferably polymer mordants are described below.

(1) Polymers having quaternary ammonium groups and groups capable of forming covalent bonds with geletin (for example, aldehydo groups, chloroalkanoyl groups, chloroalkyl groups, vinylsulfonyl groups, pyridiniumpropionyl groups, vinylcarbonyl groups, alkylsulfonoxy groups, etc.), such as

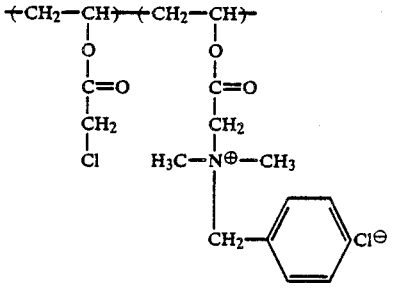

(2) Reaction products between a copolymer comprising a repeating unit of a monomer represented by the general formula described below with a repeating unit of another ethylenically unsaturated monomer and a cross-linking agent (for example, bisalkanesulfonate, bisarenesulfonate, etc.):

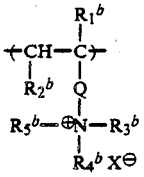

wherein $R_1^b$ represents H or an alkyl group, $R_2^b$ represents H, an alkyl group or an aryl group, Q represents a divalent group, $R_3^b$, $R_4^b$ and $R_5^b$ each represents an alkyl group, an aryl group or at least two of $R_3^b$ to $R_5^b$ are bonded together to form a hetero ring, and $X^\ominus$ represents an anion. The above described alkyl groups and aryl groups may be substituted.

(3) Polymers represented by the following general formula

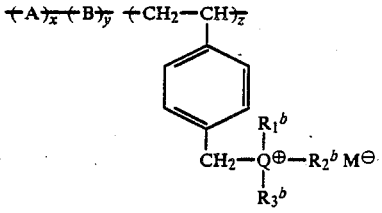

wherein x is from about 0.25 mol % to about 5 mol %, y is from about 0 mol % to about 90 mol %, z is from about 10 mol % to about 99 mol %, A represents a monomer having at least two ethlenically unsaturated bonds, B represents a copolymerizable ethylenically unsaturated monomer, Q represents N or P, $R_1^b$, $R_2^b$ and $R_3^b$ each represents an alkyl group or a cyclic hydrocarbon group or at least two of $R_1^b$ to $R_3^b$ are bonded together to form a ring (these groups and rings may be substituted, and $M^\ominus$ represents an anion.

(4) Copolymers composed of (a), (b) and (c), wherein (a) is

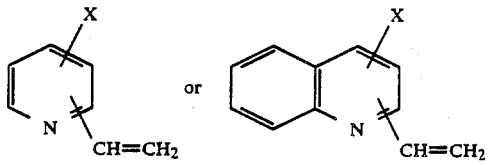

wherein X represents a hydrogen atom, an alkyl group or a halogen atom (the alkyl group may be substituted);

(b) is an acrylic ester; and (c) is acrylonitrile.

(5) Water-insoluble polymers wherein at least ⅓ of the repeating units are those represented by the following general formula

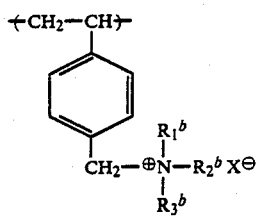

wherein $R_1^b$, $R_2^b$ and $R_3^b$ each represents an alkyl group, with the total number of carbon atoms included being 12 or more (the alkyl group may be substituted), and $X^\ominus$ represents an anion.

Various kinds of known gelatins can be employed as a binder for the mordant layer. For example, gelatin which is produced in a different manner such lime-processed gelatin, acid-possessed gelatin, etc., or a gelatin derivative which is prepared by chemically modifying gelatin such as phthalated gelatin, sulfonylated gelatin, etc., can be used. Also, gelatin subjected to a desalting treatment can be used, if desired.

The ratio of polymer mordant to gelatin and the amount of the polymer mordant coated can be easily determined by one skilled in the art depending on the amount of the dye to be mordanted, the type and composition of the polyer mordant and further on the image-forming process used. Preferably, the ratio of mordant to gelatin is from 20/80 to 80/20 (by weight) and the amount of the mordant coated is from 0.5 to 8 g/m$^2$.

The dye fixing layer (II) can have a white reflective layer. For example, a layer of titanium dioxide dispersed in gelatin can be provided on the mordant layer on a transparent support. The layer of titanium dioxide forms a white opaque layer, by which reflection color images of the transferred color images which is observed through the transparent support is obtained.

Typical dye fixing material used in the present invention is obtained by mixing the polymer containing ammonium salt groups with gelatin and applying the mixture to a transparent support.

It is not necessary that the fixing material to be white, i.e., fixing material having a pale color may also be used.

The photographic material and dye fixing material in accordance with this invention may include an inorganic or organic hardening agent in the photographic emulsion layer or a binder layer. Examples of the hardening agent include chromium salts (such as chromium alum and chromium acetate), aldehydes (such as formaldehyde, glyoxal and glutaraldehyde), N-methylol compounds (such as dimethylolurea and methyloldimethyl hydantoin), dioxane derivatives (such as 2,3-dihydroxydioxane), active vinyl compounds (such as 1,3,5-triacryloyl-hexahydro-s-triazine), 1,3-vinylsulfonyl-2-propanol), active halogen compounds (such as 2,4-dichloro-6-hydroxy-s-triazine), and muchohalogenic acids (such as mucochloric acid and mucophenoxychloric acid). They may be used either along or in combination.

A dye diffusion promoting aid may be used for diffusing a dye from the photosensitive layer to the dye fixing layer.

Water or a basic aqueous solution containing sodium hydroxide, potassium hydroxide or an inorganic alkali metal salt is used as the dye moving aid in a method involving supplying the moving aid from outside. A low-boiling solvent such as methanol, N,N-dimethylformamide, acetone or diisobutyl ketone, or a mixture of such a low boiling solvent and water or a basic aqueous solution is used. The dye moving air may be used by wetting an image receiving layer with the aid.

If the moving aid is included in the photographic material or the dye fixing material, there is no need to supply it from outside. The moving aid may be included in the form of the water of crystallization or microcapsules into the material. Alternatively, it may be included as a precursor which releases the solvent at high temperatures. Preferably, a hydrophilic solvent which is solid at room temperature but dissolves at a high temperature is included in the photographic material or the dye fixing material. The hydrophilic solvent may be included into one or both of the photographic material and the dye fixing material. If may be included into any of an emulsion layer, an intermediate layer, a protective layer and a dye fixing layer, preferably the dye fixing layer and/or a layer adjacent to the dye fixing layer.

Examples of the hydrophilic heat-solvent are ureas, pyridines, amides, sulfonamides, imides, alcohols, oximes and other heterocyclic compounds.

The photographic material of this invention may further include other compounds, such as sulfamide derivatives, cationic compounds having, for example, a pyridinium group, a surface active agents having a polyethylene oxide chain, sensitizing dyes, anti-halation and anti-irradiation dyes, hardeners, and mordanting dyes which are described, for example, in European patent Applications (OPI) Nos. 76,492 and 6,282, West German Pat. No. 3,315,485, and Japanese Patent Applications Nos. 28,928/83 and 26,008/83.

The methods described in the above patent documents may be used for exposure, etc.

EXAMPLE

Preparation of a silver iodobromide emulsion 40 g of gelatin and 26 g of potassium bromide were dissolved in 3,000 ml of water, and the solution was stirred at 50° C. A solution of 34 g of silver nitrate in 200 ml of water was added to the solution over 10 minutes. Then, a solution of 3.3 g of potassium iodide in 100 ml of water was added to the thus prepared solution over 2 minutes. The resulting silver iodobromide emulsion was precipitated by pH adjustment, and the excess of the salt was removed. Then, the pH of the emulsion was adjusted to 6.0 to give 400 g of a silver iodobromide emulsion. Preparation of a dispersion of a dye donating substance:

Each of the dye donating substances Y-1, M-1 and C-2 was weighed to each of the amounts indicated in column 1 of Table 1, and 0.5 g of 2-ethylhexyl succinate sodium sulfonate and 5 g of tricresyl phosphate (TCP) were added. Then, 30 ml of ethyl acetate was added, and the mixture was heated to about 60° C. to form a uniform solution. The solution was mixed with stirring with 100 g of a 10% aqueous solution of lime-treated gelatin, and the mixture was homogenized at 10,000 rpm for 10 minutes to obtaina dispersion (I).

Dispersions (II) to (VI) were prepared respectively by the same procedure as above except that Y-1, M-1 and C-2 were used in the amounts indicated in columns 2–6 of Table 1.

TABLE 1

| | I | II | III | IV | V | VI |
|---|---|---|---|---|---|---|
| Y-1 | 0.16 | 0.15 | 0.24 | 0.20 | 0.22 | 0.24 |
| M-1 | 0.16 | 0.20 | 0.13 | 0.19 | 0.20 | 0.16 |

TABLE 1-continued

| | I | II | III | IV | V | VI |
|---|---|---|---|---|---|---|
| C-2 | 0.18 | 0.15 | 0.13 | 0.11 | 0.08 | 0.10 (Units: g) |

Preparation of a photographic material A

| | | |
|---|---|---|
| (a) | Silver iodobromide (prepared as above) | 25 g |
| (b) | Dispersion (I) of the dye donating substance | 33 g |
| (c) | 5% Aqueous solution of compound AA | 5 ml |
| (d) | 10% Ethanol solution of guanidinetrichloroacetic acid | 12 ml |
| (e) | 10% Aqueous solution of $H_2N—SO_2—N(CH_3)_2$ | 4 ml |

Compound AA

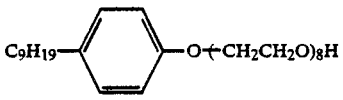

The ingredients (a) to (e) were mixed and dissolved, and the resulting solution was coated on a polyethylene terephthalate film to a wet thickness of 30 μm dried. On top of it was coated a mixed solution of (f) to (i) below to a wet thickness of 25 μm, to form a protective layer, followed by drying to form a photographic material A.

| | | |
|---|---|---|
| (f) | 10% Aqueous solution of lime-treated gelatin | 35 g |
| (g) | 10% Ethanol solution of guanidine-trichloroacetic acid | 6 ml |
| (h) | 1% Aqueous solution of 2-ethylhexyl succinate sodium sulfonate | 4 ml |
| (i) | Water | 55 ml |

Photographic materials B to F were respectively prepared in the same way as in the preparation of the photographic material A by using dispersions (II) to (VI) instead of the dispersion (I).

Preparation of a dye fixing material

A 1/1 (by weight) mixture of polyacrylic acid (the degree of polymerization 2000) and polyvinyl alcohol was coated to a thickness of 2 g/m$^2$ on a paper support laminated with polyethylene having titanium dioxide dispersed therein. On top of it was coated to a wet thickness of 70 μm a mixed solution prepared by uniformly mixing 100 g of a 10% aqueous solution of poly(-methyl acrylate-co-N,N,N-trimethyl-N-vinyl benzyl ammonium chloride) (having a molar ratio of methyl acrylate/vinyl benzyl ammonium chloride of 1/1), 120 g of a 10% polyvinyl alcohol (the saponification degree 18%, the degree of polymerization 2000) 10 g of urea and 26 g of N-methylurea. The coated layer was dried to obtain a dye fixing material.

Development

The photographic material A was exposed imagewise at 200 lux for 10 seconds by using a tungsten-filament lamp, and then unfiormly heated for 20 seconds on a heat block heated at 140° C.

The above dye fixing material impregnated with water was superimposed on the photographic material so that the coated surfaces contacted. Thirty seconds later, the image-receiving material was peeled off from the photographic material. An image which is positive with respect to the silver image was obtained on the image receiving material.

The resulting image was subjected to colorimetry at a reflection density of 0.5 and 1.2 by means of a color analyzer (Type 670 made by Hitachi Limited). The measured data and the results of visual evaluation are shown in Table. 2.

TABLE 2

| Material | Density | Colorimetric Data a* | Colorimetric Data b* | Visual Evaluation: Color Hue | Visual Evaluation: Evaluation |
|---|---|---|---|---|---|
| I | 0.5 | 1.0 | −18.5 | Bluish gray | X |
| II | 0.5 | −1.0 | −10.1 | Slightly purplish gray | O |
| | 1.2 | −0.9 | −10.6 | Slightly purplish gray | O |
| III | 0.5 | −7.2 | −2.5 | Greenish gray | O |
| | 1.2 | −6.9 | −2.2 | Greenish gray | |
| IV | 0.5 | 5.5 | −10.4 | Slightly reddish gray | O |
| | 1.2 | 5.1 | −10.0 | Slightly reddish gray | O |
| V | 0.5 | 10.0 | −6.3 | Reddish gray | Δ |
| | 1.2 | 9.5 | −6.7 | Reddish gray | Δ |
| VI | 0.5 | 1.0 | −3.0 | Easily perceptible gray | O |
| | 1.2 | 1.0 | −3.3 | Easily perceptible gray | O |

O: Acceptable as a black-and-white image
Δ: Coloration is perceptible; but acceptable as a black-and-white image
X: The image did not look gray, and was not acceptable as a black-and-white image.

It was found that by mixing the cyan, magenta and yellow dye donating substances, a gray color could be formed which many people judged to be easily seen without color changes perspectible to the naked dyes in a region ranging from the low density portion to the high density portion.

It was also found that if the a* is within 10 to −18 and b* is within 10 to −18, many observers feel that the colors are easily perceptible gray colors.

While the invention has been described in detail and with reference to specific embodiments thereof, it will be apparent to one skilled in the art that various changes and modifications can be made therein without departing from the spirit and scope thereof.

What is claimed is:

1. A thermodevelopable photographic material comprising a support, at least one photographic silver halide emulsion layer coated thereon, and a dye donating substance capable of forming or releasing a mobile dye in response to, or in inverse response to, the reduction of silver halide in said emulsion to silver by heating, wherein the color of an image formed by the fixing of each of said mobile dyes released by exposure and heating to a dye fixing layer is within the range of a* = 10 to −18 and b* = 10 to −18 determined from tristimulus values in the 10 degree visual field XYZ system under standard light C.

2. A thermodevelopable photographic material as in claim 1, wherein said dye donating substance is a compound which forms or releases a dye by the oxidation-reduction reaction of the silver halide with a reducing agent or a reducible dye donating substance, said reaction comprises that (1) the reducing agent is oxidized, and the oxidized product reacts with the dye donating substance to form or release the mobile dye, (2) the reducing agent is oxidized, and the remaining reducing agent and the dye donating substance undergo an oxidation-reduction reaction to form a reduction product of the dye donating substance which does not release a mobile dye, and the unreduced dye donating substance releases a mobile dye, (3) the reducing dye donating substance is oxidized to release the mobile dye, or (4) the reducing dye donating substance capable of releasing a mobile dye by heating is oxidized to form an oxidation product which does not release a mobile dye, and the unoxidized dye donating substance releases a mobile dye.

3. A thermodevelopable photographic material as in claim 1, wherein said dye donating substance is represented by the formula (I)

$$D—Y \qquad (I)$$

wherein D represents a dye moiety or a precursor thereof, and Y represents a substrate having a functionality such that the diffusibility of the dye donating substance represented by formula (I) changes by the oxidation-reduction reaction induced in the process of thermal development.

4. A thermodevelopable photographic material as in claim 1, wherein said material comprises dye donating substances including a yellow dye donating substance, a magenta dye donating substance, and a cyan dye donating substance.

5. A thermodevelopable photographic material as in claim 4, wherein the amount of each dye donating substance is from 0.1 to 4 moles per mole of silver in each silver halide emulsion layer.

6. A thermodevelopable photographic material as in claim 1, wherein the silver halide is coated in an amount to provide a coverage of from 1 $mg/m^2$ to 10 $g/m^2$ as silver.

7. A thermodevelopable photographic material as in claim 1, wherein said material contains an organic silver salt.

8. A thermodevelopable photographic material as in claim 7, wherein the total amount of the silver halide and the organic silver salt is from 5 $mg/m^2$ to 10 $g/m^2$ as silver.

9. A thermodevelopable photographic material as in claim 1, wherein said dye donating substance is incorporated in the silver halide emulsion layer.

10. A thermodevelopable photographic material as in claim 1, wherein silver halide emulsion layer has a layer adjacent thereto containing said dye donating substance.

11. A thermodevelopable photographic material as in claim 1, wherein said material has at least two photographic silver halide emulsion layers having the same color sensitivity.

12. A thermodevelopable photographic material as in claim 11, wherein each silver halide emulsion layer contains a dye donating substance.

13. A thermodevelopable photographic material as in claim 12, wherein said material has at least one layer adjacent to a silver halide emulsion layer, and the adjacent layer contains dye donating substance.

14. A thermodevelopable photographic material as in claim 1, wherein said dye fixing layer comprise a dye mordant.

15. A thermodevelopable photographic material as in claim 11, wherein said photographic material has a dye fixing layer on said support.

16. A thermodevelopable photographic material as in claim 1, wherein said photographic material has a dye fixing layer on a separate support.

17. A thermodevelopable photographic material as in claim 1, wherein the dye donating substance is a dye releasing redox substance.

18. A process for forming black or gray images which comprises thermodeveloping an exposed thermodevelopable photographic material comprising a support, at least one photographic silver halide emulsion layer coated thereon, and a dye donating substance capable of forming or releasing a mobile dye in response to, or in inverse response to, the reduction of the silver halide in said emulsion to silver by heating, wherein the color of an image formed by the fixing of said mobile dye released by exposure and heating to a dye fixing layer is within the range of $a^*=10$ to $-18$ and $b^*=10$ to $-18$ determined from tristimulus values in the 10 degree visual field XYZ system under standard light C, and fixing the developed material onto a fixing material.

19. A process for forming black or gray images as in claim 18, wherein the thermodeveloping is conducted at a temperature higher than 80° C.

20. A process for forming black or gray images as in claim 18, wherein said dye fixing layer comprises a dye mordant.

* * * * *